United States Patent Office 3,013,980
Patented Dec. 19, 1961

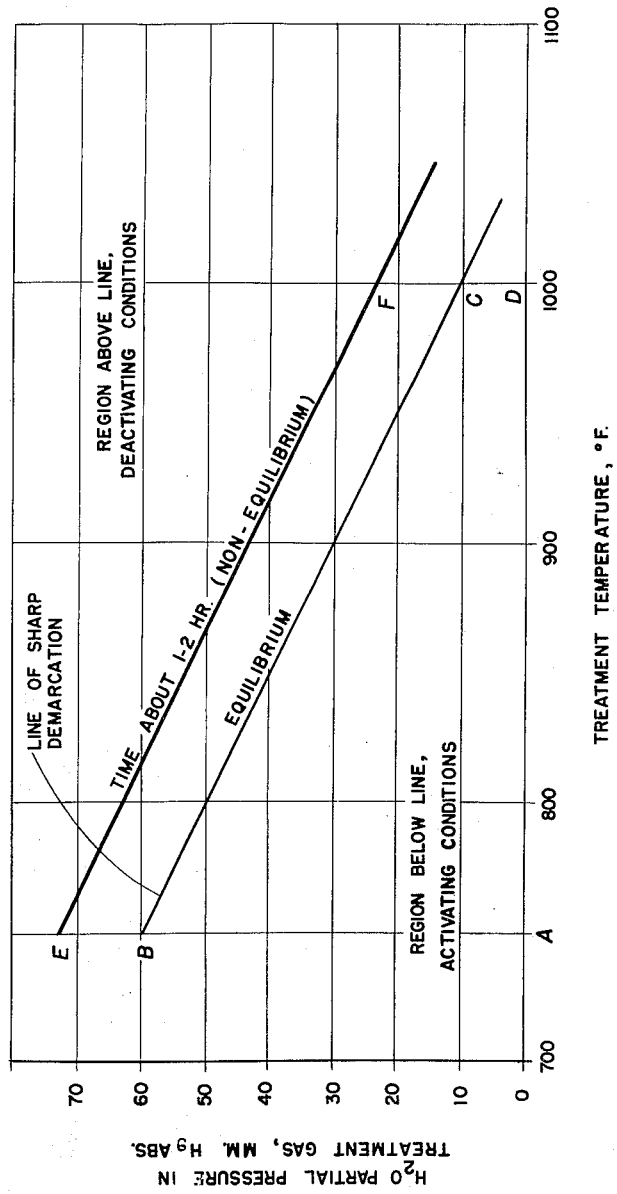

3,013,980
REACTIVATION OF SPENT ISOMERIZATION CATALYSTS
Norman L. Carr, Crystal Lake, and Vincent Brozowski, Mundelein, Ill., assignors to The Pure Oil Company, Chicago, Ill., a corporation of Ohio
Filed Dec. 23, 1957, Ser. No. 704,819
10 Claims. (Cl. 252—416)

This invention relates to a process for isomerization of hydrocarbons and is more particularly concerned with a method for reactivating catalysts used in such processes.

Straight-chain, paraffinic hydrocarbons having 4 to 7 carbon atoms in the molecule, and particularly pentane and hexane, can be isomerized to branched-chain, paraffinic hydrocarbons by contact with suitable catalysts at temperatures of the order of 650–800° F. and at pressures of the order of 100–1000 lb. per square inch, hydrogen-to-hydrocarbon mol ratios of approximately 0.5 to 5 and liquid hourly space velocities of approximately 0.5 to 10. Catalysts which are suitable for promoting the isomerization reaction are group VIII metals and compounds supported on solid, porous, acidic cracking catalysts, such as silica-alumina, silica-zirconia, silica-magnesia and silica-boria. The group VIII metal promoter may be nickel, cobalt, rhodium, palladium, platinum, iridium or combinations thereof. Catalysts composed of 0.5 to approximately 5% of nickel supported on silica-alumina in which the silica is a major constituent have been found to be effective isomerization catalysts. Also, silica-alumina supports in which the silica predominates, promoted with from 1 to 15% of nickel molybdate and subsequently reduced, are effective and have an advantage over supported nickel catalysts in that the tendency of the catalyst to promote hydrocracking is reduced. Silica-alumina cracking catalysts containing 75% silica to 25% alumina or 87% silica to 13% alumina, impregnated with from 0.1 to about 1% of palladium, platinum or iridium, have been found to be very active isomerization catalysts with a high degree of selectivity.

Any of the aforesaid catalyst foundations are useful and can be reactivated in accordance with this invention.

If the isomerization reaction is carefully controlled, the activity of the isomerization catalyst is retained over long periods of time. However, operational upsets, such as temperature levels in excess of the design level, reduction in hydrogen-to-hydrocarbon ratio, or failure to sufficiently remove sulfur from the charge material to the process, can cause catalyst fouling and loss of activity. We have found that in order to reactivate such catalysts to a maximum state of activity it is necessary to correlate the activation temperatures, time of activation and the water vapor partial pressure of the activation atmospheres.

An object of this invention is to provide a process for isomerization of paraffinic hydrocarbons. Another object of the invention is to provide an improved method for activating isomerization catalysts which have become deactivated in the process of isomerizing hydrocarbons. A still further object of the invention is to define critical conditions required to restore a deactivated isomerization catalyst to maximum activity. Other objects of the invention will become apparent from the following description and accompanying drawing, of which the single figure is a graph defining the areas of water vapor partial pressure and temperature for achieving complete reactivation of a deactivated isomerization catalyst.

Aside from poisons such as arsenic and sulfur, there are only two fundamental factors which cause temporary loss in activity of an isomerization catalyst, namely, coke deposition resulting from maloperation or accumulated over long processing periods, and unfavorable interrelations of catalysts, water vapor and temperature. Coke deposition is readily corrected by an oxidation procedure designed to burn the coke from the catalyst. The present invention resides in the discovery of the relationship of water vapor and temperature required to effect complete reactivation of isomerization catalysts of the type hereinbefore described. Deactivation of the catalyst is apparently caused by a chemical reaction involving water, either as a reactant or catalytically. This deactivation reaction has a certain activation energy and rate, dependent upon temperature and water vapor partial pressure. The deactivation is temporary and reversible, as evidenced by the fact that complete reactivation can be effected by proper treatment.

In reactivating isomerization catalysts of the type to which this invention relates, it is customary after the feed has been shut off and the heat has been decreased to a level below the active isomerization temperature, to circulate recycled gas through the catalyst until the feed lines and reactor are essentially purged of hydrocarbons. The unit is then depressurized to substantially atmospheric pressure and the catalyst is purged with a dry, inert gas, such as nitrogen, or the catalyst can be purged by evacuation under vacuum. During the purging step the catalyst bed is maintained at a temperature of about 750–800° F. After removal of combustible gas from the catalyst has been completed, the oxidation step is commenced. Carrier gas, such as carbon dioxide containing about 1–5% oxygen, is admitted to the bed at a temperature of about 750–800° F. and the rate of oxygen is controlled so that the oxidation-front temperature does not exceed the desired regeneration temperature, which may be anywhere from 750–1000° F., but preferably about 850–900° F. Oxidation is continued for a time consistent with complete removal of coke deposited thereon and thorough oxidation of the catalyst. During this oxidation step, the water vapor partial pressure is maintained within the area defined by the drawing, and preferably at a level of about 1–5 mm. of mercury.

After the oxidation step is completed and the oxygen-containing gas is purged from the reactor by means of an inert gas, such as nitrogen, the catalyst is reduced in an atmosphere of hydrogen or hydrogen-rich gas at approximately the same temperatures used in the oxidation step. The reduction step is carried out until the catalyst promoter is reduced to its lowest form of oxidation under the conditions of reduction. At the conclusion of the reduction step, the unit is again pressurized to reaction pressure by hydrogen circulation and brought to the proper temperature level before hydrocarbon gas is again charged to the unit.

The presence of trace water in the amounts in which it ordinarily occurs in the hydrocarbons and hydrogen fed to a catalytic isomerization process has no effect on the activity of the catalyst under normal processing conditions. However, high water vapor partial pressure, high temperature and/or extended processing times at unfavorable operating conditions cause the catalyst to become temporarily deactivated. We have found that such temporarily deactivated catalysts can be completely reactivated if the water vapor partial pressure and temperature during the reactivation steps are controlled so as to fall within the area bounded by A—B—C—D on the accompanying drawing. Additionally, such catalysts can be fully reactivated at water vapor partial pressures and temperatures falling within the area A—E—F—D if the time of contact during each of the oxidation and reduction steps does not exceed about one hour.

By referring to the drawing, it will be noted that the limits of temperature for the oxidation and reduction steps are 750–1000° F. Below 750° F. regeneration is not practical and not economical, and above 1000° F. there is danger of permanently destroying the catalyst. As long as the water vapor partial pressure and temperatures are correlated within the area A—B—C—D, time is not an important factor, but where the water vapor partial pressure and temperature conditions fall within the area B—E—F—C the time factor does become important, and if the time to which the catalyst is subjected to the oxidation and/or the reducing atmosphere exceeds about one hour, proper reactivation of the catalyst will not occur.

The following table illustrates the effect of various conditions in the activation of a catalyst composed of 0.4% palladium supported on 87% silica–13% alumina, synthetic cracking catalyst, which catalyst has been employed in the isomerization of normal pentane under the following operating conditions:

Temperature _____ °F__ 750
Pressure _____ p.s.i__ 400
Hydrogen-to-hydrocarbon ratio_____ 1.7
Liquid volume hourly space velocity_____ 3

This catalyst had a maximum activity of 52 to 53% isopentane yield under these conditions. The catalyst was made by depositing a hydrochloric acid solution of palladium chloride on the silica-alumina, drying the resulting catalyst, and oxidizing and reducing it in accordance with the method heretofore outlined in the oxidation and reduction for activating for activating the catalyst.

pressure of 25 mm. of mercury, after it had been reduced for 10 hours at 975° F. with 0 water vapor partial pressure. In run 3 the hydrogenation was completed at 975° F. and 15 mm. water vapor partial pressure for a period of 20 hours. These conditions fall on the line B—C. In run 11 the reduction was carried out at 990° F. at 15 mm. water vapor partial pressure for 20 hours.

It will be noted that although the conditions of runs 7 and 8 fall within the area A—B—C—D, the catalyst did not reach a complete state of reactivation. This can be explained by the fact that although the partial pressure of the water vapor in the gas used in the reactivation was zero, water was formed during both the oxidation and reduction steps, with the result that the resulting gases in contact with the catalyst had a water vapor partial pressure above the permissible limit. This effect is particularly evident at higher temperatures of reactivation, such as 1000° F., due to the rapid reaction. It is expedient, therefore, when conducting the oxidation or reduction at temperatures above 950° F. to put a vacuum on the reactor in order to rapidly withdraw reaction products therefrom and keep the water vapor partial pressure at a low level.

Run 15 demonstrates that the lower reactivation temperatures, exceeding the permissible water vapor partial pressure, although affecting the ability to fully regenerate the catalyst, do not have the drastic effect that is ex-

*Table I*

| Run No. | Oxidation | | | Reduction | | | Iso-Pentane Yield percent | Previous Use, Run No. |
|---|---|---|---|---|---|---|---|---|
| | Temp., °F. | Time, hr. | Water Partial Pressure, mm. Hg | Temp., °F. | Time, hr. | Water Partial Pressure, mm. Hg | | |
| 1 | 975 | 1 | 0 | 975 / 825 | 10 / 20 | 0 / 25 | 54 | -------- |
| 2 | 975 | 1 | 0 | 975 / 975 | 10 / 2 | 0 / 25 | 9 | -------- |
| 3 | 975 | 1 | 0 | 975 / 975 | 10 / 20 | 0 / 15 | 9.4 | 1 |
| 4 | 975 | 1 | 0 | 975 | 10 | 0 | 54 | 2 |
| 5 | 975 | 1 | 0 | 975 / 975 | 10 / 2 | 0 / 15 | 52.5 | 3 |
| 6 | 900 | 2 | 0 | 850 | 10 | 0 | 54.2 | 4 |
| 7 | 900 | 2 | 0 | 1,000 | 10 | 0 | 40.5 | 5 |
| 8 | 1,000 | 2 | 0 | 1,000 | 10 | 0 | 43 | 6 |
| 9 | 1,000 | 2 | 0 | 850 | 10 | 0 | 50.4 | 7 |
| 10 | 900 | 2 | 15 | 900 | 1 | 15 | 51.7 | -------- |
| 11 | 990 | 0.25 | 0 | 990 | 20 | 15 | 15 | -------- |
| 12 | 900 | 1 | 15 | 900 | 1 | 15 | 53.5 | 11 |
| 13 | 900 | 1 | 25 | 900 | 1 | 25 | 53.5 | -------- |
| 14 | 825 | 1 | 35–45 | 825 | 18 | 35–45 | 51 | 13 |
| 15 | 825 | 1 | 55–70 | 825 | 18 | 40–60 | 45 | 14 |
| 16 | 825 | 1 | 75 | 825 | 17 | 75 | 51.1 | 15 |
| 17 | 850 | 1 | ~92 | 850 | 60 | ~92 (Hot) | 6.6 | 16 |
| 18 | 850 | 1 | Evac., Dry | 850 | 1.5 | Evac., Dry | 21.1 | 17 |
| 19 | 850 | 1 | 15 | 850 | 1 | Dry | 48.1 | 18 |
| 20 | 750 | 16 | 50 | 850 | 1 | Dry | 53.2 | (¹) |
| 21 | 900 | 16 | 15 | 850 | 1 | Dry | 16 | (¹) |
| 22 | 750 | 1 | 15 | 850 | 1 | Dry | 33 | (¹) |
| 23 | 900 | 1 | 50 | 850 | 1 | Dry | 32 | (¹) |
| 24 | 750 | 1 | 16 | 850 | 1 | Dry | 52.5 | (¹) |

¹ Deactivated as in run 2 before treatment given.

Runs 1, 4 ¹, 5 ¹, 6, 9, 10, 12, 13, 14, 20 and 24 in the foregoing table demonstrate that if conditions of temperature and water vapor partial pressure during the oxidation and reduction steps are kept within the area A—B—C—D, substantially complete reactivation of the catalyst is obtained. Runs 2, 3, 11 and 17 demonstrate that when the temperature and water vapor partial pressure are not correlated so as to fall within the area A—B—C—D, the catalyst is not activated, i.e., where the conditions fall within the area B—E—F—C and these conditions are maintained for a period in excess of about one hour. In run 2 the catalyst was subjected to reduction for two hours at 975° F. at a water vapor partial ¹ Runs 4 and 5 are in fact reactivations for deactivated catalyst in runs 2 and 3, respectively.

perienced at the higher temperature level.

The purpose of runs 20 to 24 was to find the gross effects of three variables on their ability to reactivate a deactivated catalyst. The same catalyst was used in each of these runs and was deactivated prior to each run by oxidizing it at a temperature of 975° F. for a period of one hours with a dry mixture of 95% nitrogen and 5% oxygen, and then reducing the oxidized catalyst in two stages, in the first stage of which the temperature was 975° F. with dry hydrogen for ten hours and in the second stage the temperature was 975° F. with hydrogen containing water at 25 mm. of mercury partial pressure and the time was two hours. These conditions produced a catalyst having a relative activity of 0.7, that is, it was only 7% as active as a fully activated catalyst. The Latin square was set up with these variables and levels:

(1) Oxidation temperature, 750 and 900° F.
(2) Oxidation time, 1 and 16 hours.
(3) Water partial pressure during oxidation, 15 and 50 mm. of mercury.

All other factors were held constant, even the extent of drying before the reduction step. The reactor was purged with dry nitrogen until the effluent was under 400 p.p.m. water.

The results of these tests were of great importance for many reasons. The first treatment (run 20) produced an excellent result of high yield and low side-reaction rate. Run 21 produced an active "hot" catalyst with a low isomer yield. Actually, the hydro cracking rate in this run was greater than in run 23, although it is not obvious from the table. Inasmuch as the deactivation treatment before this test was such that a low yield and low cracking yield would result, it is evident that this treatment produced an entirely different catalyst.

Run 22 showed that the isomerization rate was increased over the "dead" catalyst but the relative activity compared to the standard was only about one-half and the hydrocracking rate remained unchanged.

Run 23 showed that side-reaction rate was increased by more than eightfold and the isomer yield was increased but only to a relatively low level. The reaction heat effects were not noted to be more than those of a normal run. This was contrary to the experience in run 21.

One of the most important results was concerned with run 24. In run 23 the catalyst was active and non-selective and such a condition had never been changed to one of high activity and high selectivity. Run 20 conditions were repeated in run 24. Not only was an active and selective catalyst produced, but the results of run 20 were checked.

The results of runs 19, 22 and 24 indicate that it is necessary to go through a deactivation step for a catalyst of high side-reaction rates and then reactivate by proper procedures in accordance with this invention in order to obtain a catalyst for producing high yields and low hydrocracking rates.

It will be apparent from the results obtained in the runs shown in Table I that in order to avoid difficulty from the excessive water vapor formed in the reaction, the temperature of reactivation should not exceed 950° F. and the water vapor partial pressure of the gas used in the oxidation and reduction steps should be below about 15 mm. of mercury, and preferably about 1–5 mm.

Experience has shown that if the gases used in the reactivation of the catalyst are substantially dry, that is, if the water vapor partial pressure is less than about 1 mm. of mercury, the catalyst can be subjected to temperatures as high as 975° F. for extended times without deleteriously affecting the efficiency of the regeneration operation, and can be subjected to temperatures up to 1000° F. for a period of not more than about one hour. If the gasses in the reactivation system in contact with the catalyst contain as much as 15 mm. of water vapor partial pressure, the catalyst cannot be exposed to these conditions for a period of time of more than one hour at a temperature of 975° F. without adversely affecting the reactivation of the catalyst. Water vapor partial pressures of 25 mm. of mercury or greater at temperatures of 975° F. and above cannot be tolerated.

Although the experimental results illustrated in Table I were obtained with catalysts composed of palladium on silica-alumina synthetic cracking catalysts, it will be understood that the critical conditions required for complete reactivation of the catalyst applies equally well to any deactivated isomerization catalyst which contains a group VIII metal on an acidic, solid, porous support, particularly on a silica-alumina support in which the silica predominates.

The invention is applicable to the reactivation of a deactivated catalyst as well as to the activation of freshly prepared or "green" catalysts.

We claim as our invention:

1. In the reactivation of a spent isomerization catalyst comprising a catalyst promoter selected from the group consisting of group VIII noble metals on an acidic silica-alumina support, the steps of oxidizing said catalyst in an atmosphere of oxygen-containing gas for a time sufficient to oxidize completely all contaminants on said catalyst and to oxidize said catalyst promoter, followed by reduction of the catalyst in an atmosphere of hydrogen-rich gas for a time sufficient to reduce said catalyst promoter completely, the temperature and water partial pressure of each of said atmospheres being maintained at values within the area bounded by A—B—C—D on the accompanying drawing.

2. In the reactivation of a spent isomerization catalyst comprising a catalyst promoter selected from the group consisting of group VIII noble metals on an acidic silica-alumina support, the steps of oxidizing said catalyst in an atmosphere of oxygen-containing gas for a time sufficient to oxidize completely all contaminants on said catalyst and to oxidize said catalyst promoter, followed by reduction of the catalyst in an atmosphere of hydrogen-rich gas for a time sufficient to reduce said catalyst promoter completely, the temperature and water vapor partial pressure of said atmospheres being maintained at values within the area defined by A—E—F—D on the accompanying drawing, and limiting the time of contact of the catalyst with each of said atmospheres to not more than about one hour.

3. In the reactivation of a spent isomerization catalyst comprising a catalyst promoter selected from the group consisting of group VIII noble metals on an acidic silica-alumina support, the steps of oxidizing said catalyst in an atmosphere of oxygen-containing gas for a time sufficient to oxidize completely all contaminants on said catalyst and to oxidize said catalyst promoter, followed by reduction of the catalyst in a hydrogen-rich atmosphere for a time sufficient to reduce said catalyst promoter completely, the temperature and water vapor partial pressure of said atmospheres being maintained at values within the area defined by A—E—F—D on the accompanying drawing, and limiting the time to not more than about one hour during which the catalyst is subjected in the oxidizing and reducing atmospheres to temperature and water vapor partial pressures defined by the area B—E—F—C on the accompanying drawing.

4. Method in accordance with claim 3 in which the temperature in the oxidation and reduction steps is about 850 to 950° F. and the partial pressure of water vapor does not exceed 15 millimeters of mercury.

5. Method in accordance with claim 3 in which the catalyst is palladium supported on synthetic, acidic silica-alumina cracking catalyst.

6. Method in accordance with claim 3 in which the catalyst is composed of platinum supported on a silica-alumina acidic cracking catalyst.

7. Method in accordance with claim 3 in which the catalyst comprises a group VIII noble metal supported on a synthetic acidic silica-alumina cracking catalyst, predominantly silica.

8. Method in accordance with claim 4 in which the temperature in the oxidation and reduction steps is approximately 850° F. and the water vapor partial pressure is not in excess of about 5 millimeters of mercury.

9. Method in accordance with claim 5 in which the catalyst contains about 0.4% by weight of palladium supported on a silica-alumina cracking catalyst containing about 87% by weight of silica and about 13% by weight of alumina.

10. Method in accordance with claim 9 in which the catalyst is activated at temperatures of 825–950° F. in oxidizing and reducing atmospheres having a water vapor partial pressure below 15 millimeters of mercury.

References Cited in the file of this patent
UNITED STATES PATENTS

| | | |
|---|---|---|
| 2,671,763 | Winstrom et al. | Mar. 9, 1954 |
| 2,870,085 | Love | Jan. 20, 1959 |
| 2,879,232 | Malo et al. | Mar. 24, 1959 |
| 2,882,241 | Slyngstad et al. | Apr. 14, 1959 |